United States Patent
Ito

(10) Patent No.: US 12,553,577 B2
(45) Date of Patent: Feb. 17, 2026

(54) ON-VEHICLE HYDROGEN SUPPLY APPARATUS

(71) Applicant: TOYOTA JIDOSHA KABUSHIKI KAISHA, Aichi-ken (JP)

(72) Inventor: Naoaki Ito, Kariya (JP)

(73) Assignee: TOYOTA JIDOSHA KABUSHIKI KAISHA, Aichi-Ken (JP)

( * ) Notice: Subject to any disclaimer, the term of this patent is extended or adjusted under 35 U.S.C. 154(b) by 280 days.

(21) Appl. No.: 18/342,737

(22) Filed: Jun. 28, 2023

(65) Prior Publication Data

US 2024/0003495 A1   Jan. 4, 2024

(30) Foreign Application Priority Data

Jul. 4, 2022   (JP) ................. 2022-107522

(51) Int. Cl.
F17C 7/04   (2006.01)

(52) U.S. Cl.
CPC ........ *F17C 7/04* (2013.01); *F17C 2201/0109* (2013.01); *F17C 2201/056* (2013.01); *F17C 2203/0673* (2013.01); *F17C 2205/0111* (2013.01); *F17C 2205/0323* (2013.01); *F17C 2221/012* (2013.01); *F17C 2223/013* (2013.01); *F17C 2265/066* (2013.01); *F17C 2270/0168* (2013.01); *F17C 2270/0184* (2013.01)

(58) Field of Classification Search
CPC ............... F17C 7/04; F17C 2201/0109; F17C 2201/056; F17C 2203/0673; F17C 2205/0111; F17C 2205/0323; F17C 2221/012; F17C 2223/013; F17C 2265/066; F17C 2270/0168; F17C 2270/0184; B60K 2015/03315; B60K 15/07; F02M 21/06; F02M 21/0221; F02M 21/029; F02M 21/0293; F02M 21/0206; F02M 21/0242; F02M 21/0287
See application file for complete search history.

(56) References Cited

U.S. PATENT DOCUMENTS

| | | | |
|---|---|---|---|
| 2004/0251007 A1* | 12/2004 | Toh | F17C 1/00 165/157 |
| 2007/0102433 A1 | 5/2007 | Allidieres et al. | |
| 2007/0137591 A1* | 6/2007 | Sugimoto | F02M 21/06 123/527 |
| 2009/0272590 A1* | 11/2009 | Kim | B60K 15/03006 180/69.5 |
| 2011/0180551 A1* | 7/2011 | Handa | B60K 15/03006 220/592.2 |

(Continued)

FOREIGN PATENT DOCUMENTS

| | | | |
|---|---|---|---|
| JP | 2007516384 A | 6/2007 | |
| JP | 2007278319 A | * 10/2007 | |

*Primary Examiner* — Joel M Attey
*Assistant Examiner* — Brahim A. Michael Adeniji
(74) *Attorney, Agent, or Firm* — HAUPTMAN HAM, LLP

(57) ABSTRACT

An on-vehicle hydrogen supply apparatus includes a hydrogen supply unit that includes a liquid hydrogen tank, a vaporizer that vaporizes liquid hydrogen, and a pressure chamber that is filled with vaporized hydrogen gas and supplies the filled hydrogen gas to a hydrogen engine for driving a vehicle, and supplies the hydrogen gas vaporized from the liquid hydrogen to the hydrogen engine. The apparatus also has a cover that houses the hydrogen supply unit.

3 Claims, 4 Drawing Sheets

(56) References Cited

U.S. PATENT DOCUMENTS

| | | | |
|---|---|---|---|
| 2019/0047411 A1* | 2/2019 | Kataoka | B60K 15/07 |
| 2022/0306310 A1* | 9/2022 | Sibbach | B64D 37/30 |
| 2023/0014654 A1* | 1/2023 | Montgomery | F17C 13/04 |
| 2023/0366513 A1* | 11/2023 | Minas | F17C 6/00 |

* cited by examiner

ON-VEHICLE HYDROGEN SUPPLY APPARATUS

CROSS REFERENCE TO RELATED APPLICATION

This application claims priority to Japanese Patent Application No. 2022-107522 filed on Jul. 4, 2022, which is incorporated herein by reference in its entirety including the specification, claims, drawings, and abstract.

TECHNICAL FIELD

The present disclosure relates to a configuration of an on-vehicle hydrogen supply apparatus that supplies hydrogen gas to a hydrogen engine for driving a vehicle.

BACKGROUND

In recent years, vehicles running on liquid hydrogen have been used. JP 2007-516384 A discloses an on-vehicle fuel tank composed of an inner casing that contains liquid hydrogen, and an outer casing that supports the inner casing via a vacuum heat-insulation layer.

CITATION LIST

PATENT DOCUMENT 1: JP 2007-516384 A

SUMMARY

The vehicles running on liquid hydrogen are equipped with a liquid hydrogen tank, a vaporizer that vaporizes liquid hydrogen, and a hydrogen supply unit that fills a space with vaporized hydrogen gas and supplies the filled hydrogen gas to a fuel cell, hydrogen engine, or the like. It is desired to prevent or reduce damage to such a hydrogen supply unit in the event of a vehicle collision.

An object of the present disclosure is therefore to prevent or reduce damage to the hydrogen supply unit in the event of a vehicle collision.

An on-vehicle hydrogen supply apparatus according to the present disclosure includes a hydrogen supply unit that includes a liquid hydrogen tank, a vaporizer that vaporizes liquid hydrogen, and a pressure chamber that is filled with vaporized hydrogen gas and supplies the filled hydrogen gas to a hydrogen engine for driving a vehicle, and supplies the hydrogen gas vaporized from the liquid hydrogen to the hydrogen engine. The on-vehicle hydrogen supply apparatus also includes a cover that houses the hydrogen supply unit.

As such, the hydrogen supply unit is housed in the cover and mounted on the vehicle, and this makes it possible to prevent or reduce damage to the hydrogen supply unit in the event of a vehicle collision.

In the on-vehicle hydrogen supply apparatus according to the present disclosure, the cover for the hydrogen supply unit may include a partition plate that separates an interior space into a first space that houses the liquid hydrogen tank and a second space that houses the vaporizer and the pressure chamber.

As such, the partition plate is located between the liquid hydrogen tank and the pressure chamber and between the liquid hydrogen tank and the vaporizer to separate the space that houses them, and this makes it possible to prevent contact between the liquid hydrogen tank and the pressure chamber and between the liquid hydrogen tank and the vaporizer in the event of a vehicle collision, thereby preventing or reducing damage thereto.

In the on-vehicle hydrogen supply apparatus according to the present disclosure, the hydrogen supply unit may include a pressure reducing valve that is located above the vaporizer in the second space and reduces the pressure of the hydrogen gas filled in the pressure chamber, and the cover may include a stay that extends into the second space and supports an upper part of the pressure reducing valve.

This makes is possible to prevent oscillation of an upper end of the pressure reducing valve, which may otherwise cause damage to the pressure reducing valve in the event of a vehicle collision.

In the on-vehicle hydrogen supply apparatus according to the present disclosure, the cover may include a lower cover that houses a lower part of the liquid hydrogen tank and has, at its rear side, a pedestal on which the vaporizer is mounted, an upper cover that is assembled to the upper side of the lower cover so as to cover an upper part of the liquid hydrogen tank and houses the pressure chamber therein, and a rear cover that is attached to the upper side of the pedestal of the lower cover so as to cover the vaporizer mounted on the pedestal and is connected to a rear end of the upper cover.

As such, the cover is composed of the lower cover, the upper cover, and the rear cover, and this allows the cover to house the hydrogen supply unit easily even if the shape of the hydrogen supply unit is complicated.

In the on-vehicle hydrogen supply apparatus according to the present disclosure, the liquid hydrogen tank has a cylindrical shape, and the partition plate has a flat section that is attached to the upper side of the lower cover and covers the upper part of the liquid hydrogen tank, and a curved section that curves downward from the flat section along an outer circumference of the liquid hydrogen tank and extends to a front end of the pedestal of the lower cover. The first space is a space on the lower side of the partition plate, and the second space is a space on the upper and rear sides of the partition plate. The pressure chamber may be located between the partition plate and a ceiling plate of the upper cover, and the vaporizer may be located between the partition plate and the rear cover.

As such, the pressure chamber and the vaporizer are located between the partition plate and the upper cover or the rear cover, and this makes it possible to prevent direct transmission of impact force to the pressure chamber and the vaporizer in the event of a vehicle collision, thereby preventing or reducing damage to the pressure chamber and the vaporizer.

In the on-vehicle hydrogen supply apparatus according to the present disclosure, the hydrogen supply unit may include a pressure reducing valve that is located above the vaporizer in the second space and reduces the pressure of the hydrogen gas filled in the pressure chamber, and the rear cover may include a stay that extends into the second space and supports an upper part of the pressure reducing valve.

This makes it possible to prevent oscillation of an upper end of the pressure reducing valve which may cause damage to the pressure reducing valve in the event of a vehicle collision.

In the on-vehicle hydrogen supply apparatus according to the present disclosure, the upper cover, the lower cover, and the rear cover may be made of CFRP. The partition plate may also be made of CFRP.

By forming the covers and the partition plate from such a high-strength material, damage to the hydrogen supply unit housed in the cover can be effectively prevented or reduced in the event of a vehicle collision.

According to the present disclosure, it is possible to prevent or reduce damage to the hydrogen supply unit in the event of a vehicle collision.

BRIEF DESCRIPTION OF DRAWINGS

An embodiment of the present disclosure will be described based on the following figures, wherein.

DESCRIPTION OF EMBODIMENT

Figure 1:
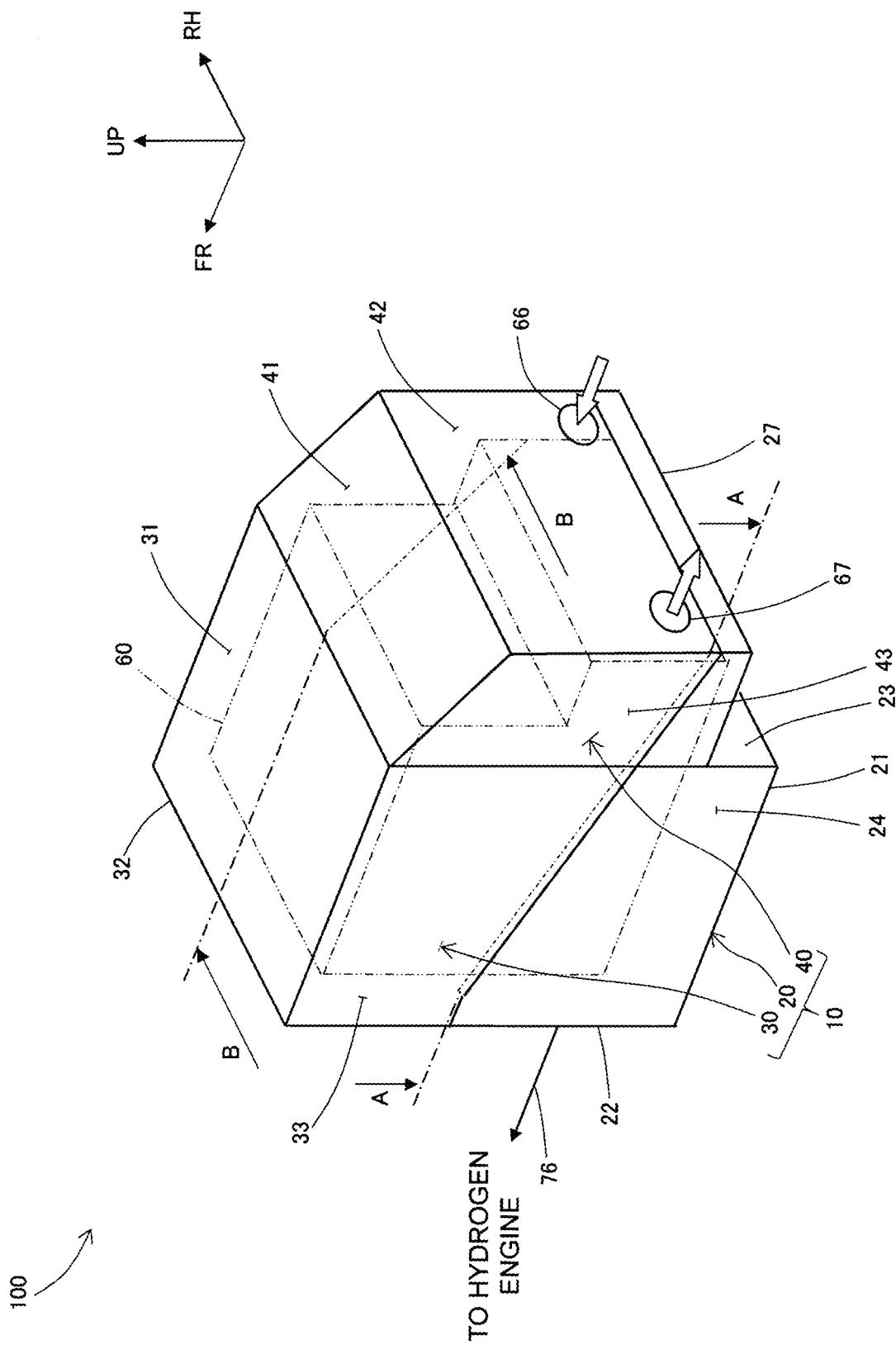
FIG. 1 is a perspective view of an on-vehicle hydrogen supply apparatus according to an embodiment viewed from the rear side.

Hereinafter, an on-vehicle hydrogen supply apparatus 100 according to an embodiment will be described with reference to the drawings. In the drawings, arrows "FR," "UP," and "RH" respectively represent the front side, the upper side, and the right side of the on-vehicle hydrogen supply apparatus 100. The directions opposite to the arrows "FR," "UP," and "RH" respectively represent the rear side, the lower side, and the left side of the on-vehicle hydrogen supply apparatus 100. Hereinafter, when the description is given simply using front and rear, right and left, and up and down directions, they respectively indicate front and rear in the front-and-rear direction, right and left in the right-and-left direction, and up and down in the up-and-down direction of the on-vehicle hydrogen supply apparatus 100, unless otherwise mentioned. The on-vehicle hydrogen supply apparatus 100 is mounted on a vehicle such that its front side is at the front side of the vehicle (traveling direction), its upper side is at the upper side of the vehicle, and its right side is at the right side of the vehicle. Therefore, when the on-vehicle hydrogen supply apparatus 100 is mounted on the vehicle, its front side, upper side, and right side are respectively located at the front side, the upper side, and the right side of the vehicle.

As shown in FIG. 1, the on-vehicle hydrogen supply apparatus 100 is composed of a hydrogen supply unit 60 that supplies hydrogen gas vaporized from liquid hydrogen to a hydrogen engine for driving the vehicle, and a cover 10 that houses the hydrogen supply unit 60. The cover 10 is composed of a lower cover 20, an upper cover 30, and a rear cover 40.

Figure 2:
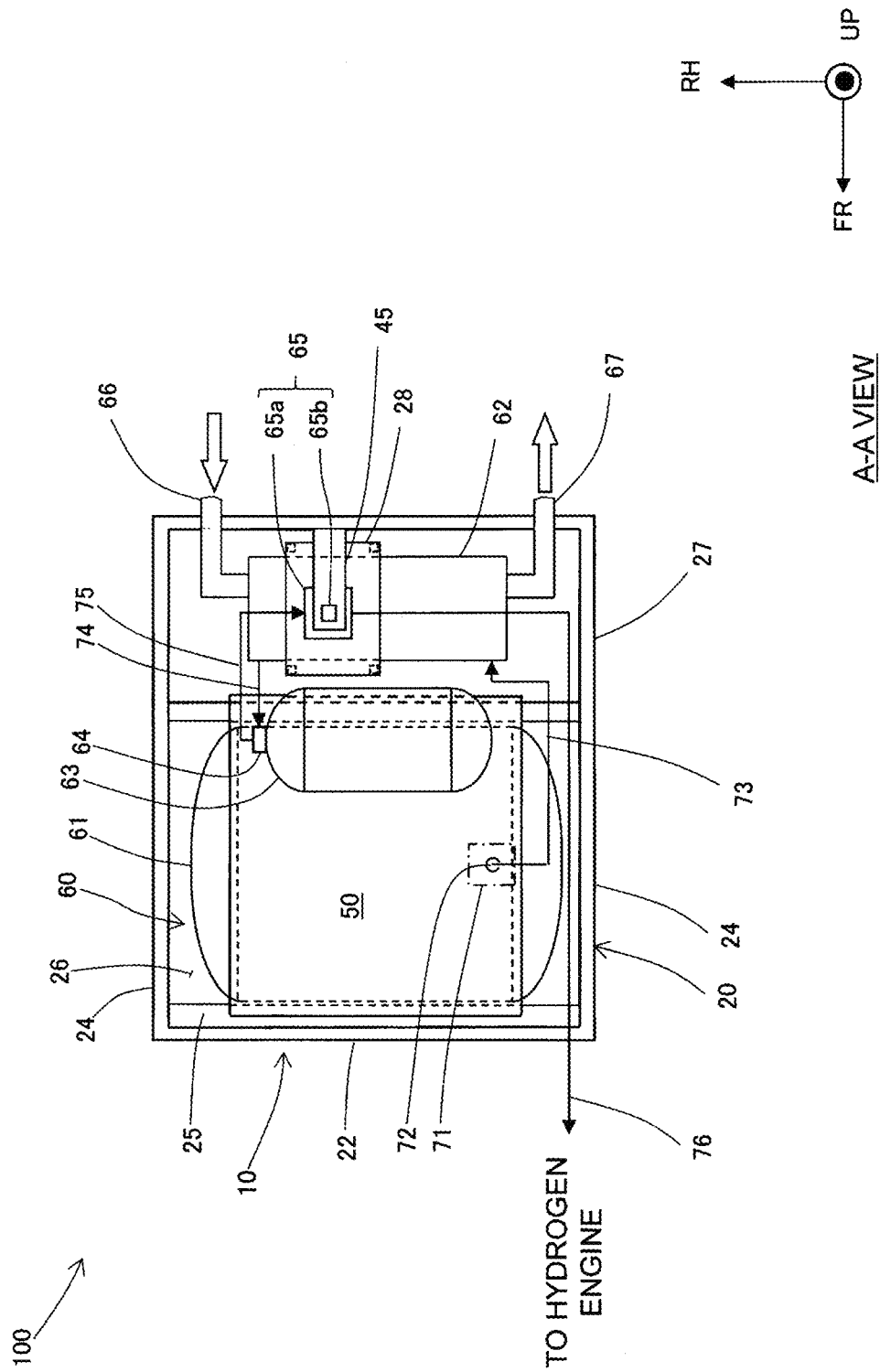
FIG. 2 is a plane view of the on-vehicle hydrogen supply apparatus shown in FIG. 1 viewed from above, with its upper cover removed, along A-A in FIG. 1.
Figure 3:
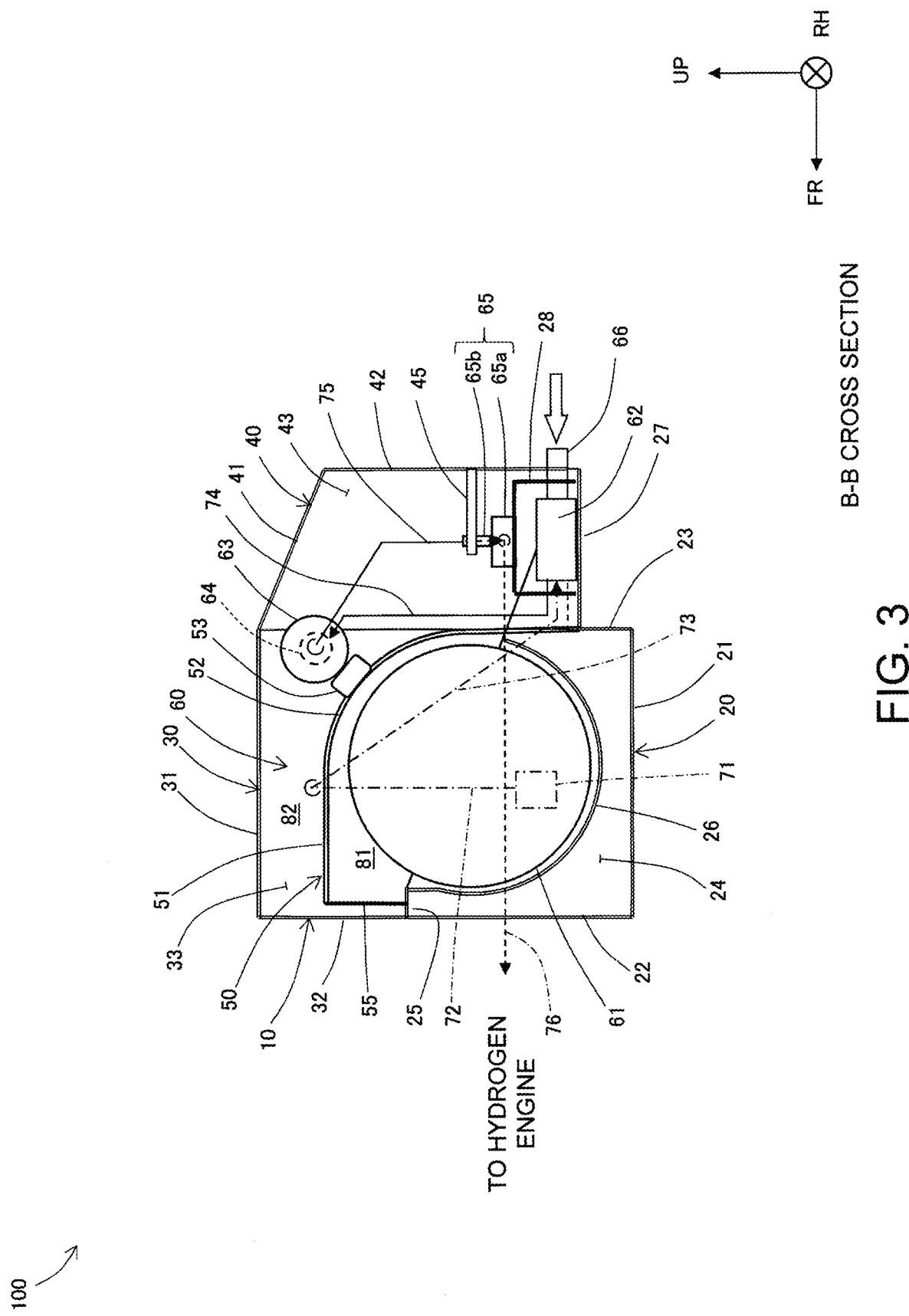
FIG. 3 is an elevated cross-sectional view of the on-vehicle hydrogen supply apparatus shown in FIG. 1, taken along B-B in FIG. 1.

Before describing the details of the cover 10, the hydrogen supply unit 60 will be described in detail with reference to FIGS. 2 and 3. As shown in FIGS. 2 and 3, the hydrogen supply unit 60 is composed of a liquid hydrogen tank 61, a vaporizer 62, a pressure chamber 63, a pressure reducing valve 65, a liquid hydrogen pump 71, and pipes 72 to 76.

The liquid hydrogen tank 61 is an insulated tank that contains low-temperature liquid hydrogen. The liquid hydrogen tank 61 is a cylindrical tank with dish-shaped mirror plates attached to both ends. The liquid hydrogen pump 71 is located inside the liquid hydrogen tank 61 and applies pressure to liquid hydrogen to transfer it to the vaporizer 62. The vaporizer 62 vaporizes liquid hydrogen to hydrogen gas by heat exchange between liquid hydrogen flowing from the liquid hydrogen tank 61 and helium gas heated by a heater (not shown). Helium gas enters the vaporizer 62 through a helium gas inlet pipe 66 and returns to the heater through a helium gas return pipe 67 (see FIG. 1).

The pressure chamber 63 is filled with hydrogen gas that flows from the vaporizer 62. Hydrogen gas filled in the pressure chamber 63 is supplied to the hydrogen engine through the pressure reducing valve 65. The pressure chamber 63 is a cylindrical chamber with full hemispherical mirror plates attached to both ends. The mirror plate on the right side of the pressure chamber 63 has a pipe connection seat 64 attached thereto. The pressure reducing valve 65 has a valve body 65a, and an actuator 65b that protrudes upward. The pressure reducing valve 65 reduces the pressure of the high pressure hydrogen gas flowing from the pressure chamber 63 to the supply pressure of hydrogen gas to be supplied to the hydrogen engine.

The liquid hydrogen pump 71 in the liquid hydrogen tank 61 is connected to the vaporizer 62 via the liquid hydrogen discharge pipe 72 and the vaporizer inlet pipe 73. The vaporizer 62 is connected to the pressure chamber 63 via the hydrogen gas filler pipe 74. The pressure chamber 63 is connected to the pressure reducing valve 65 via the hydrogen gas outlet pipe 75. After the pressure reducing valve 65 reduces the pressure of hydrogen gas, the resulting hydrogen gas is supplied to the hydrogen engine through the hydrogen gas supply pipe 76.

Returning to FIG. 1, the cover 10 will now be described in detail. As described above, the cover 10 is composed of the lower cover 20, the upper cover 30, and the rear cover 40. First, the external shapes of the lower cover 20, the upper cover 30, and the rear cover 40 will be described.

The lower cover 20 has a square box shape with an open top surrounded by a bottom plate 21, a lower front plate 22, a lower rear plate 23, and lower right and left side plates 24. The height of the lower rear plate 23 is lower than the height of the lower front plate 22. Upper ends of the lower right and left side plates 24 slope downward from the front to the rear. A plate-like pedestal 27 is attached to the rear side of the lower rear plate 23 of the lower cover 20 so as to protrude rearward. Rear parts of the lower right and left side plates 24 extend onto the pedestal 27 and are connected to right and left ends of the pedestal 27. The lower cover 20, the upper cover 30, the rear cover 40, and the pedestal 27 are made of carbon fiber reinforced plastics (hereinafter referred to as CFRP).

The upper cover 30 is composed of a ceiling plate 31, an upper front plate 32, and upper right and left side plates 33. The height of the upper right and left side plates 33 is higher in the rear than in the front, and lower ends of the upper right and left side plates 33 slope downward from the front to the rear. The upper cover 30 is assembled to the upper side of the lower cover 20 such that a lower end of the upper front plate 32 comes into contact with an upper end of the lower front plate 22 of the lower cover 20 and lower ends of the upper right and left side plates 33 come into contact with upper ends of the lower right and left side plates 24. When the upper cover 30 and the lower cover 20 are assembled vertically, they form a square box shape where the rear side of the upper cover 30 is open.

The rear cover 40 is composed of a rear ceiling plate 41, a rear plate 42, and rear right and left side plates 43. Like the rear parts of the lower right and left side plates 24 of the lower cover 20, lower ends of the rear right and left side plates 43 slope downward from the front to the rear. The rear cover 40 is assembled to the lower cover 20 and the upper cover 30 such that a front end of the rear ceiling plate 41 comes into contact with a rear end of the ceiling plate 31, front ends of the rear right and left side plates 43 come into contact with rear ends of the upper right and left side plates 33 and the lower right and left side plates 24, lower ends of the rear right and left side plates 43 come into contact with upper ends of portions of the lower right and left side plates 24 that extend above the pedestal 27, and that a lower end of the rear plate 42 comes into contact with an upper end of the pedestal 27.

When the lower cover 20, the upper cover 30, and the rear cover 40 are assembled, they form the cover 10, which has a square box shape with a portion protruding rearward, as shown in FIG. 1.

Figure 4:
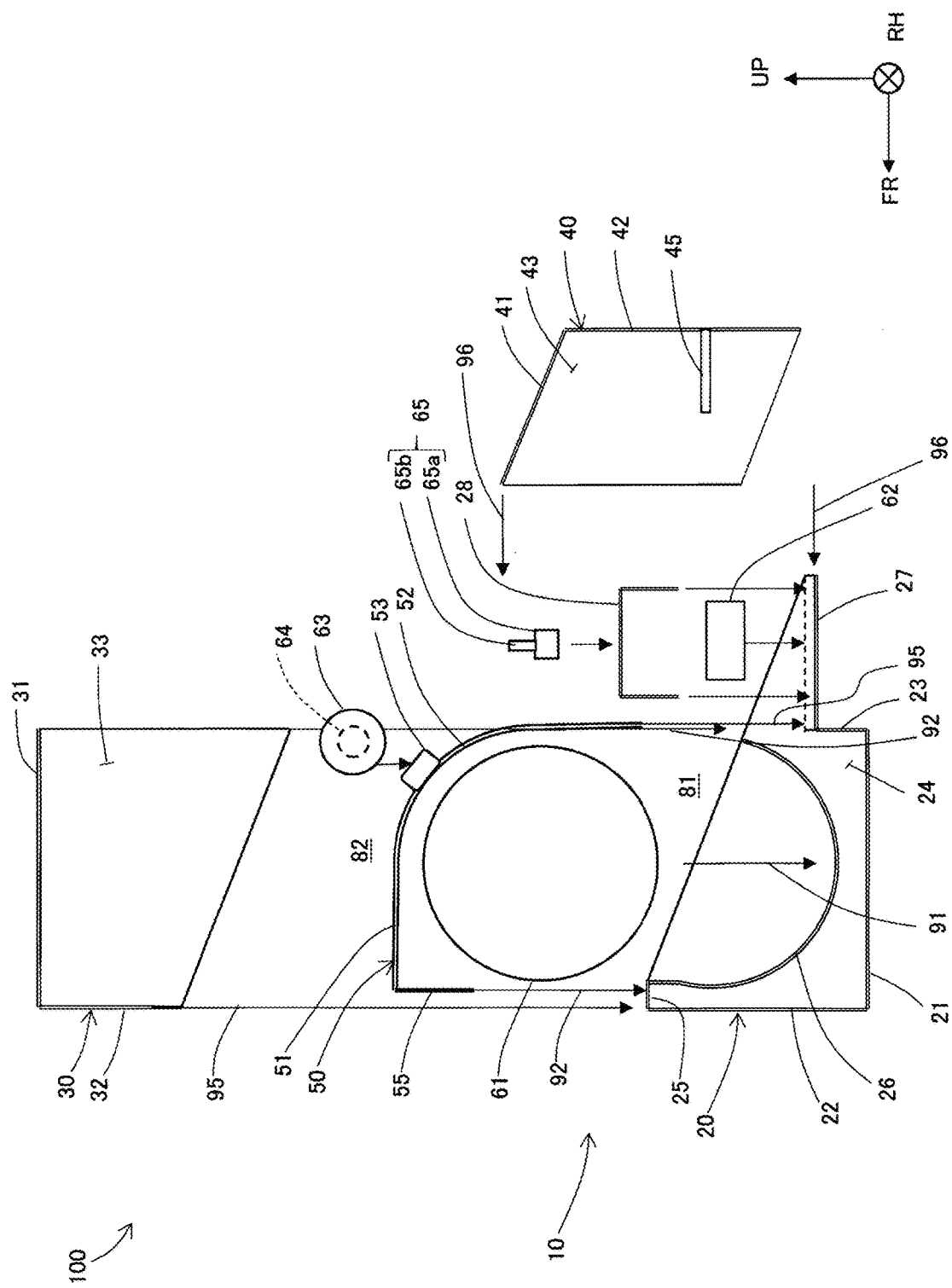
FIG. 4 is an exploded cross-sectional view of the on-vehicle hydrogen supply apparatus shown in FIG. 1.

Next, the internal structure of the cover 10 will be described with reference to FIGS. 2 to 4. As shown in FIGS. 3 and 4, a tank receiving plate 26 is mounted inside the lower cover 20. The tank receiving plate 26 has a cylindrical surface to receive the liquid hydrogen tank 61. As shown in FIG. 2, the tank receiving plate 26 is connected to the lower right and left side plates 24 and to the bottom plate 21 via a plurality of supporting members (not shown). As shown in FIGS. 3 and 4, an upper front end of the tank receiving plate 26 and the upper end of the lower front plate 22 are connected by a connecting plate 25. The tank receiving plate 26 receives the lower part of the liquid hydrogen tank 61. The vaporizer 62 is mounted on the pedestal 27 on the rear side of the tank receiving plate 26. Furthermore, a groove-shaped frame 28 with an open bottom is mounted above the pedestal 27 so as to straddle the vaporizer 62. The pressure reducing valve 65 is mounted on the frame 28.

The rear cover 40 has a stay 45 protruding forward from the rear plate 42 inside the rear cover 40. The stay 45 supports the actuator 65b of the pressure reducing valve 65 when the rear cover 40 is assembled to the lower cover 20 and the upper cover 30.

As shown in FIGS. 3 and 4, a partition plate 50 is provided on the upper side of the lower cover 20. The partition plate 50 has a flat section 51, a curved section 52, and a post 55. The flat section 51 is a section attached to the upper side of the lower cover 20 and covers the upper part of the liquid hydrogen tank 61. The curved section 52 is a section that curves downward from the flat section 51 along the outer circumference of the liquid hydrogen tank 61 and extends to the front end of the pedestal 27 of the lower cover 20. As shown in FIG. 2, the width of the partition plate 50 in the right-and-left direction is smaller than the widths of the inner surfaces of the upper cover 30 and the lower cover 20 in the right-and-left direction.

The post 55 connects the front end of the flat section 51 to the connecting plate 25 of the lower cover 20 to support the flat section 51. The lower end of the curved section 52 is connected to the lower rear plate 23 of the lower cover 20. A base 53 for supporting the pressure chamber 63 is mounted on the upper surface of the curved section 52 of the partition plate 50. The pressure chamber 63 is mounted on the upper side of the base 53.

The liquid hydrogen tank 61 is received in the tank receiving plate 26 of the lower cover 20, as indicated by an arrow 91 in FIG. 4. The partition plate 50 is attached to the connecting plate 25 and the lower rear plate 23 of the lower cover 20 so as to cover the top of the liquid hydrogen tank 61, as indicated by arrows 92 in FIG. 4. The upper cover 30 is placed over the partition plate 50 and the pressure chamber 63 from above as indicated by arrows 95 in FIG. 4 and is assembled to the lower cover 20 such that its lower ends come into contact with the upper ends of the lower cover 20. When assembled on top of the lower cover 20, the upper cover 30 covers the upper part of the liquid hydrogen tank 61 and houses the pressure chamber 63 therein. The rear cover 40 is assembled to the lower cover 20 and the upper cover 30 so as to cover the vaporizer 62 and the pressure reducing valve 65 from above and behind, as indicated by arrows 96 in FIG. 4.

As such, when the components constituting the hydrogen supply unit 60 are housed in the interior space of the cover 10, the lower cover 20, the lower half of the upper cover and the partition plate 50 define a first space 81. The first space 81 is a space located on the lower side of the partition plate 50. The first space 81 houses the liquid hydrogen tank 61.

The partition plate 50, the pedestal 27, the upper half of the upper cover 30, and the rear cover 40 define a second space 82. The second space 82 is a space on the upper and rear sides of the partition plate 50. The second space 82 houses the pressure chamber 63 and the vaporizer 62. The pressure chamber 63 is located between the partition plate 50 and the ceiling plate 31 of the upper cover 30. The vaporizer 62 and the pressure reducing valve 65 are located between the partition plate 50 and the rear plate 42 of the rear cover 40.

As such, the partition plate 50 separates the interior space of the cover 10 into the first space 81 that houses the liquid hydrogen tank 61 and the second space 82 that houses the vaporizer 62 and the pressure chamber 63. The stay 45 attached to the rear cover 40 fits into the circumference of the actuator 65b of the pressure reducing valve 65 to thereby support the actuator 65b in the front and back direction and the right and left direction.

As described above, the on-vehicle hydrogen supply apparatus 100 is mounted on the vehicle with the hydrogen supply unit 60 housed in the cover 10, and this prevents or reduces damage to the hydrogen supply unit 60 in the event of a vehicle collision. The on-vehicle hydrogen supply apparatus 100 also has the partition plate 50 that separates the interior space of the cover 10 into the first space 81 where the liquid hydrogen tank 61 is housed and the second space 82 where the pressure chamber 63 and the vaporizer 62 are housed. This makes it possible to prevent contact between the liquid hydrogen tank 61 and the pressure chamber 63 and between the liquid hydrogen tank 61 and the vaporizer 62 in the event of a vehicle collision, thereby preventing or reducing damage thereto.

In addition, the cover 10 is composed of the lower cover 20, the upper cover 30, and the rear cover 40, and this allows the cover 10 to house the hydrogen supply unit 60 even if the shape of the hydrogen supply unit 60 is complicated.

Furthermore, the pressure chamber 63 and the vaporizer 62 are located between the partition plate 50 and the upper cover 30 or the rear cover 40, and this makes it possible to prevent direct transmission of impact force to the pressure chamber 63 and the vaporizer 62 in the event of a vehicle collision, thereby preventing or reducing damage to the pressure chamber 63 and the vaporizer 62.

The stay 45, which is attached to the rear cover 40, supports the actuator 65b at the upper side of the pressure reducing valve 65 and thus can prevent or reduce damage to the pressure reducing valve 65 in the event of a vehicle collision. Furthermore, the lower cover 20, the upper cover 30, the rear cover 40, and the partition plate 50 are made of high-strength CFRP, and this makes it possible to effectively prevent or reduce damage to the hydrogen supply unit 60 in the event of a vehicle collision.

The invention claimed is:

1. An on-vehicle hydrogen supply apparatus, comprising:
a hydrogen supply unit that comprises:
  a liquid hydrogen tank containing liquid hydrogen,
  a vaporizer configured to vaporize the liquid hydrogen to obtain vaporized hydrogen gas, and
  a pressure chamber that is filled with the vaporized hydrogen gas and configured to supply the filled hydrogen gas vaporized from the liquid hydrogen to a hydrogen engine for driving a vehicle, and
  a cover that houses the hydrogen supply unit,
wherein the cover for the hydrogen supply unit includes a partition plate that separates an interior space of the cover into a first space that houses the liquid hydrogen tank, and a second space that houses the vaporizer and the pressure chamber,
the hydrogen supply unit includes a pressure reducing valve that is located above the vaporizer in the second space and configured to reduce a pressure of the hydrogen gas filled in the pressure chamber,
the cover further comprises a stay that extends into the second space and supports an upper part of the pressure reducing valve,
the cover further comprises:
  a lower cover that houses a lower part of the liquid hydrogen tank and has, at its rear side, a pedestal on which the vaporizer is mounted,
  an upper cover that is assembled to the upper side of the lower cover so as to cover an upper part of the liquid hydrogen tank and houses the pressure chamber therein, and
  a rear cover that is attached to the upper side of the pedestal of the lower cover so as to cover the vaporizer mounted on the pedestal and is connected to a rear end of the upper cover,
the liquid hydrogen tank has a cylindrical shape,
the partition plate has
  a flat section that is attached to the upper side of the lower cover and covers the upper part of the liquid hydrogen tank, and
  a curved section that curves downward from the flat section along an outer circumference of the liquid hydrogen tank and extends to a front end of the pedestal of the lower cover,
the first space is a space on the lower side of the partition plate,
the second space is a space on the upper and rear sides of the partition plate,
the pressure chamber is located between the partition plate and a ceiling plate of the upper cover,
the vaporizer is located between the partition plate and the rear cover, and
the hydrogen supply unit further comprises a tank receiving plate mounted inside the lower cover for receiving the liquid hydrogen tank, and a part of the tank receiving plate is connected to a part of the lower cover.

2. The on-vehicle hydrogen supply apparatus according to claim 1, wherein the partition plate further has a post connecting a part of the flat section of the partition plate to a part of the lower cover.

3. The on-vehicle hydrogen supply apparatus according to claim 2, wherein
the pressure reducing valve has, at the upper side of the pressure reducing valve, an actuator that protrudes upward, and
the stay is attached to the rear cover, and fits into a circumference of the actuator to support the actuator in a front and back direction and a right and left direction.

* * * * *